United States Patent [19]

Strazik et al.

[11] 3,726,934
[45] Apr. 10, 1973

[54] PROCESS FOR THE SEPARATION OF STYRENE FROM ETHYL BENZENE

[75] Inventors: William F. Strazik, St. Ann; Eli Perry, St. Louis, both of Mo.

[73] Assignee: Monsanto Company, St. Louis, Mo.

[22] Filed: Dec. 20, 1971

[21] Appl. No.: 210,115

[52] U.S. Cl. ..........................260/669 A, 260/674 R
[51] Int. Cl. ...............................................C07c 15/10
[58] Field of Search .......................260/669 A, 674 R

[56] References Cited

UNITED STATES PATENTS 2,947,687   8/1960   Lee...................................260/674 R
2,958,657   11/1960  Binning et al.....................260/674 R Primary Examiner—Curtis R. Davis
Attorney—Lynden N. Goodwin et al.

[57] ABSTRACT

Styrene is separated from organic mixtures comprising styrene and ethyl benzene by contacting the mixture against one side of a polymeric membrane and withdrawing at the other side a vaporous mixture having increased styrene concentration. The polymer membrane is an acrylonitrile-containing polymer or acrylonitrile-containing polymer blend. Exemplary of the polymer membranes are copolymers of acrylonitrile and acrylic acid, 2-methyl-5-vinyl-pyridine, isobutylene, isoprene, and styrene and blends of polyacrylonitrile and poly(ethylenimine).

6 Claims, No Drawings

PROCESS FOR THE SEPARATION OF STYRENE FROM ETHYL BENZENE

BACKGROUND OF THE INVENTION

1. Field of the Invention

This invention relates to a process for separating styrene from organic mixtures containing same. In a particular aspect, this invention relates to a process for the separation of styrene from organic mixtures comprising styrene and ethyl-benzene by preferential permeation through a polymer membrane under pervaporation conditions. In a more particular aspect, this invention relates to a process for the separation of stryene from organic mixtures comprising styrene and ethyl benzene by contacting said mixtures against one side of an acrylonitrile containing polymer membrane which is (1) a copolymer of (a) acrylonitrile, and (b) a monomer or monomers polymerizable therewith or (2) a blend of acrylonitrile polymer and recovering on the other side a vaporous mixture rich in styrene.

2. Description of the Prior Art

Separation of styrene from organic mixtures such as mixtures of styrene and ethyl benzene has been accomplished by distillation procedures. Separation of styrene from an azeotropic mixture of styrene and 2-chloroethane by pervaporation through a membrane is known to the art from U.S. Pat. No. 2,953,502 issued Sept. 20, 1960 to R. C. Binning and Robert J. Lee.

SUMMARY OF THE INVENTION

It has been discovered in accordance with the present invention that styrene is effectively separated from organic mixtures comprising styrene and ethyl benzene by contacting the mixture against one side of an acrylonitrile-containing polymeric membrane and withdrawing at the second side a vaporous mixture having a higher concentration of styrene than the aforesaid mixture. Certain of the membranes employed in the process of the present invention are highly efficient in separating styrene from ethyl benzene using pervaporation separation techniques. The present invention is further advantageous in that it permits avoidance of costly distillation procedures.

DETAILED DESCRIPTION

Process of the present invention comprises contacting an organic feed mixture comprising styrene and ethyl benzene against one side of a membrane and withdrawing at the second side a mixture having a higher concentration of the preferentially permeable styrene than the aforesaid feed mixture. It is essential that the mixture at the second side be maintained at a lower chemical potential than feed side. It is also essential that the product be withdrawn at the second side in the vapor state. In the commercial utilization of the process multi-stage operation is feasible since this permits the operation of individual stages at various concentrations and temperatures in order to achieve the optimum driving force for the process.

For each individual stage, the effectiveness of the separation is shown by the separation factor (S.F.)

The separation factor (S.F.) is defined as the ratio of the concentrations of two substances, A and B, to be separated, divided into the ratio of concentrations of the corresponding substances in the permeate, $$S.F. = [(C_A/C_B) \text{ in permeate}]/[(C_A/C_B) \text{ in permeant}]$$

where $C_A$ and $C_B$ are the concentrations of the preferentially permeable component and any other component of the mixture or the sum of other components respectively.

In carrying out the process of the present invention, the first or feed side of the membrane is under a pressure such that the activities of the components are greater than the activities on the second side. Preferably, the first side is about atmospheric pressure and the second side below atmospheric pressure. Still more preferably, the second side is maintained such that the pressure differential is greater than 0.01 atmosphere or preferably from about 0.1 to about 0.5 atmosphere. A further preferred mode of operation is with the second side maintained at a vacuum of greater than 0.2 mm. Hg.

The term "Chemical Potential" is employed herein as described by Olaf A. Hougen and K. M. Watson ("Chemical Process Principles, Part II", John Wiley, New York, 1947). It is related to the escaping tendency of a substance from any particular phase. For an ideal vapor or gas, this escaping tendency is equal to the partial pressure so that its varies greatly with changes in the total pressure. For a liquid, the change in escaping tendency as a function of total pressure is small. The escaping tendency always depends upon the temperature and concentration. In the present invention, the feed substance is typically a liquid solution and the other side of the membrane is maintained such that a vapor phase exists. A vapor feed may be employed when the mixture to be separated is available in that form from an industrial process or when heat economies are to be effected in a multi-stage process.

As previously stated, the feed side may be at pressure less than atmospheric but preferably greater than atmospheric and also at pressures over and above the vapor pressure of the liquid components. The collection or permeate vapor side of the membrane is preferably less than atmospheric pressure but under proper feed side conditions, also may be greater than atmospheric pressure. The total pressure on the feed side is preferably between 0 psi absolute and 5000 psig.

The conditions are always such as to maintain a higher chemical potential on the feed side than on the collection or vapor side.

The temperatures on the feed side and the collection side may vary over a wide range. However, temperatures should be avoided which causes substantial decomposition of any of the organic materials in the mixture or of the membrane and which cause the vapor pressure on the collection side of any of the permeated materials to be exceeded by the pressure being maintained on that side. Typically an increase in temperature causes an increase in permeation rate. A dramatic increase in rate often occurs when the temperature exceeds the glass transition temperature of the polymeric membrane being used in the separation procedure.

Separations are carried out by removal of the preferentially permeable styrene through the membrane with the said styrene, in a higher concentration than in the feed, being recovered from the collection side of the membrane as a vapor and with the imposition of a state of lower chemical potential on such collection side of the membrane. For example, a mixture of styrene and ethyl benzene may be applied to one side of a flat diaphram or membrane to accomplish removal of at least a part of the styrene, leaving a more highly concentrated ethyl benzene solution at the feed side of the membrane or diaphram. A state of lower chemical potential is maintained on the collection or downstream side of the membrane by vacuum e.g. from 0.1 mm to the vapor pressure of the organic component of the mixture which has lowest vapor pressure at the membrane at the respective temperature as long as the vapor phase is present on the downstream side.

In the system referred to above, the styrene selectively passes through the membrane with the styrene-rich composition being rapidly removed as a vapor from the collection side of the membrane.

In contrast to the present invention the employment of permeates in liquid phase on the second side of the membrane is impractical because the applied pressure has been found to be prohibitively high, e.g. up to 1000 atmospheres being necessary because of osmotic pressures. The liquid-liquid permeation is largely an equilibrium phenomenon unless the osmotic forces are overcome while in contrast liquid-vapor or vapor-vapor permeations are rate processes even at moderate conditions in which the vapor is removed as soon as it reaches the collection surface of the membrane. Liquid-vapor and vapor-vapor separations are accordingly much more effectively carried out than liquid-liquid separations.

The permeation membrane used in the process of the present invention is an acrylonitrile polymer. The acrylonitrile polymer may be polyacrylonitrile, a copolymer of acrylonitrile, and a monomer copolymerizable therewith or a polymer blend containing acrylonitrile polymer. The membrane may be a simple disk or sheet of the membrane substance which is suitably mounted in a duct or pipe or mounted in a plate and frame filter press. Other forms of membrane may also be employed such as hollow tubes and fibers through which or around which the feed is supplied or recirculated with the product being removed at the other side of the tubes as a vapor. Various other useful shapes and sizes are readily adaptable to commercial installations. Because of their high efficiency the membranes preferred for use in the process of the present invention are (1) copolymers of (a) acrylonitrile and (b) acrylic acid, 2-methyl-5-vinylpyridine, isobutylene, isoprene, and styrene and (2) polymer blend of (a) acrylonitrile polymer and (b) poly(ethylenimine) polymer. The polymeric components may be linear or crosslinked and may vary over a wide range of molecular weights. The membrane, of course, must be insoluble in the organic separation medium. "Membrane insolubility" as used herein is taken to include that the membrane material is not substantially solution-swellable or sufficiently weakened by its presence in the solution to impart "rubbery" characteristics which can cause creep and rupture under the conditions of use, including high pressures. The polymers may be polymerized or so treated that various endgroups are present in the polymeric material. For maximum effectiveness, the copolymer or polymer blend should contain a sufficient amount of acrylonitrile or other essential monomers to substantially maintain the physical and chemical characteristics of the materials. To obtain optimum results the essential acrylonitrile typically constitutes 30 percent or more of the total polymeric material and preferably 50 percent or more of the total polymeric material. In the case of copolymers the percent is mole percent, and in the case of blends the percent is weight percent.

The membrane may be prepared by any suitable procedure such as, for example, by casting a film or spinning a hollow fiber from a "dope" containing polymer and solvent. Such preparations are well known to the art.

An important control over the separation capacity of a particular membrane is exercised by the method used to form and solidify the membrane (e.g. casting from a melt into controlled atmospheres or from solution into baths at various concentrations and temperatures).

The art of membrane usage is well known with substantial literature being available on membrane support, fluid flow and the like. The present invention is practiced with such conventional procedures and apparatus. The membrane must, of course, be sufficiently thin to permit permeation as desired but sufficiently thick so as to not rupture under the pressure conditions employed. Typically suitable membranes have a thickness of from about ½ to about 10 mils.

The following examples illustrate specific embodiments of the present invention. In the examples the membranes employed were in the form of film disks and were mounted in a membrane holder. All membranes were prepared by casting from solution.

EXAMPLES 1-15

Membrane permeations were conducted for the purpose of separating styrene from an organic liquid consisting of 70 wt. percent styrene and 30 wt. percent ethyl benzene using acrylonitrile polymer membranes of the present invention. The separations were carried out under pervaporation conditions. Each membrane was approximately 1 mil thick. In each run, preferential permeation of styrene was effected. The results are shown in Table 1. In each run, the pressure on the liquid side was atmospheric and the pressure on the vapor side was 0.1 mm Hg.

In the Table, a range of separation factors shows multiple runs.

TABLE 1

| Membrane (copolymer in Mole %) | Temperature °C | S.F. |
|---|---|---|
| 1. Polyacrylonitrile | 24 | 1.1–1.2 |
| 2. Acrylonitrile/acrylic acid (9%) | 24 | 1.0–108 |
| 3. Acrylonitrile/acrylic acid (9%) | 50 | 1.3 |
| 4. Acrylonitrile/acrylic acid (9%) | 24 | 1.0–1.2 |
| 5. Acrylonitrile/2-methyl-5 vinylpyridine (30%) | 24 | 1.1–1.3 |
| 6. Acrylonitrile/2-methyl-5 vinylpyridine (30%) | 50 | 1.2–1.9 |
| 7. Acrylonitrile/4-vinylpyridine (69%) | 24 | 1.0 |
| 8. Acrylonitrile/isobutylene (19%) | 24 | 1.3 |
| 9. Acrylonitrile/vinylacetate (15%) | 24 | 1.2 |
| 10. Acrylonitrile/isoprene (54%) | 24 | 1.6 |
| 11. Acrylonitrile/styrene (15%) | 24 | 1.6 |
| 12. Acrylonitrile/styrene (24%) | 24 | 1.2 |
| 13. Acrylonitrile/styrene (24%)* | 24 | 1.1 |
| 14. Acrylonitrile/stryene (38%) 24 | | 1.2–1.5 |
| 15. Acrylonitrile/methyl vinyl ketone (5%) | 24 | 1.0 |

* Cast with 0.1% styrene monomer in casting solution

EXAMPLES 16–21

Permeations were conducted following the general procedure of Examples 1–15 for the purpose of separating styrene from an organic liquid consisting of 70 wt. percent styrene and 30 wt. percent ethyl benzene. The results are shown in Table II.

TABLE II

| Membrane (polymer blend) | Temperature °C | S.F. |
|---|---|---|
| 16. Polyacrylonitrile/polyvinylchloride | 24 | 1.1 |
| 17. Polyacrylonitrile/copolymer of acryl-onitrile/sodium styrene sulfonate (55%)$^x$ (4)$^y$ | 24 | 1.0–1.1 |
| 18. Polyacrylonitrile/copolymer of acryl-onitrile/sodium styrene sulfonate (55%)$^x$ (4%)$^y$ | 50 | 1.0 |
| 19. Polyacrylonitrile/copolymer of acryl-onitirle/styrene (60%)$^x$ (10%)$^y$ | 24 | 0.2 |
| 20. Polyacrylonitrile/poly(N-vinyl-2-pyrrolidone) | 24 | ~1 |
| 21. Polyacrylonitrile/poly(ethylenimine) (15%)$^y$ | 24 | 2.8 |

$^x$ copolymer in Mole%
$^y$ Blend in weight %

While the invention has been described with reference to particular embodiments thereof, it will be appreciated that modifications and variations are possible without departing from the invention.

We claim:

1. Process for the separation of styrene from organic feed mixtures comprising styrene and ethylbenzene which comprises contacting the mixture against one side of a polymeric acrylo-nitrile-containing membrane and withdrawing at the second side a vaporous mixture having a higher concentration of styrene than the aforesaid feed mixture with the mixture at the second side being maintained at a lower chemical potential than the feed side.

2. The process of claim 1 wherein the pressure on the second side of the membrane is less than atmospheric pressure and lower than the pressure on the other side of the membrane.

3. The process of claim 1 wherein the feed mixture is a liquid mixture.

4. The process of claim 1 wherein the membrane comprises a copolymer of (a) acrylonitrile and (b) a member selected from the group consisting of acrylic acid, methylvinylpyridine, isobutylene, isoprene and styrene.

5. THe process of claim 1 wherein the membrane comprises a polymer blend.

6. The process of claim 5 wherein the membrane is polyacylonitrile/poly(ethylenimine).

* * * * *